US012456924B2

United States Patent
Koo et al.

(10) Patent No.: US 12,456,924 B2
(45) Date of Patent: Oct. 28, 2025

(54) DRIVING CONTROL DEVICE OF RELAY FOR BATTERY PACK

(71) Applicant: SAMSUNG SDI CO., LTD., Yongin-si (KR)

(72) Inventors: Kyo Sung Koo, Yongin-si (KR); Duck Hyun Kim, Yongin-si (KR); Kwang Min Yoo, Yongin-si (KR); Gi Ho Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 215 days.

(21) Appl. No.: 18/477,401

(22) Filed: Sep. 28, 2023

(65) Prior Publication Data

US 2024/0235398 A1 Jul. 11, 2024

(30) Foreign Application Priority Data

Jan. 9, 2023 (KR) ........................ 10-2023-0002755

(51) Int. Cl.
*H02M 3/158* (2006.01)
*H02J 7/00* (2006.01)
(Continued)

(52) U.S. Cl.
CPC ..... *H02M 3/1582* (2013.01); *H02J 7/007182* (2020.01); *H02J 7/04* (2013.01); *H02M 1/0025* (2021.05)

(58) Field of Classification Search
CPC ...... H02M 3/1582; H02M 1/0025; H02J 7/04; H02J 7/007182
See application file for complete search history.

(56) References Cited

U.S. PATENT DOCUMENTS 5,602,462 A * 2/1997 Stich ........................ H02J 9/062 307/64
9,054,538 B2 6/2015 Kim
(Continued)

FOREIGN PATENT DOCUMENTS

CN 211826956 U 10/2020
DE 102021113688 A1 12/2022
(Continued)

OTHER PUBLICATIONS

EPO Extended European Search Report dated Dec. 6, 2024, issued in Corresponding European Patent Application No. 23212890.0, 14 pages.

*Primary Examiner* — Rafael O De Leon Domenech
(74) *Attorney, Agent, or Firm* — Womble Bond Dickinson (US) LLP

(57) ABSTRACT

A driving control device for a relay for a battery pack, includes: a buck-boost converter to receive a voltage from an auxiliary battery, and output a buck-boost voltage; a feedback control circuit electrically connected to the buck-boost converter, and to transfer a feedback voltage to the buck-boost converter to control the buck-boost voltage output from the buck-boost converter; and a relay control circuit to apply or block the buck-boost voltage to a relay electrically connected to at least one of a positive electrode terminal or a negative electrode terminal of a main battery. The buck-boost converter is to output the buck-boost voltage according to the feedback voltage, and the buck-boost voltage has a smaller sustaining voltage for maintaining the relay in an on state than a first reference voltage for turning on the relay.

11 Claims, 2 Drawing Sheets

110 Buck-boost converter
Vout
1
140 Relay control circuit
MCU 130
120
T2 R1 T1
R4 R3
2
R2
GND
Vf

(51) Int. Cl.
*H02J 7/04* (2006.01)
*H02M 1/00* (2006.01)

(56) References Cited

U.S. PATENT DOCUMENTS

| | | | | |
|---|---|---|---|---|
| 2014/0062413 | A1 | 3/2014 | Kim | |
| 2020/0144840 | A1* | 5/2020 | Masuda | B60L 50/16 |
| 2022/0271362 | A1 | 8/2022 | Kim | |

FOREIGN PATENT DOCUMENTS

| | | | |
|---|---|---|---|
| KR | 10-2014-0029800 | A | 3/2014 |
| KR | 10-2022-0023887 | A | 3/2022 |
| WO | WO 2022/158347 | A1 | 7/2022 |

* cited by examiner

DRIVING CONTROL DEVICE OF RELAY FOR BATTERY PACK

CROSS-REFERENCE TO RELATED APPLICATION

This application claims priority to and the benefit of Korean Patent Application No. 10-2023-0002755, filed on Jan. 9, 2023, in the Korean Intellectual Property Office, the entire disclosure of which is incorporated by reference herein.

BACKGROUND

1. Field

Aspects of embodiments of the present disclosure relate to a driving control device of a relay for a battery pack.

2. Description of the Related Art

In general, a relay may be used for opening and closing a battery pack with high current. The relay may include high current ends having a small resistance to reduce power consumption and heat generation, and coil ends having large inductive reactance and low resistance. The relay may be driven (e.g., opened or closed) based on voltages applied to the coil ends.

The above information disclosed in this Background section is for enhancement of understanding of the background of the present disclosure, and therefore, it may contain information that does not constitute prior art.

SUMMARY

One or more embodiments of the present disclosure are directed to a driving control device for a relay for a battery pack having improved energy efficiency through power reduction, by reducing a sustaining voltage for maintaining or substantially maintaining the relay in an on state, compared to a first reference voltage for turning on the relay.

One or more embodiments of the present disclosure are directed to a driving control device for a relay for a battery pack having improved safety by including a microcontroller to diagnose whether or not a monitoring operation of a buck-boost voltage is abnormal.

According to one or more embodiments of the present disclosure, a driving control device for a relay for a battery pack, includes: a buck-boost converter configured to receive a voltage from an auxiliary battery, and output a buck-boost voltage; a feedback control circuit electrically connected to the buck-boost converter, and configured to transfer a feedback voltage to the buck-boost converter to control the buck-boost voltage output from the buck-boost converter; and a relay control circuit configured to apply or block the buck-boost voltage to a relay electrically connected to at least one of a positive electrode terminal or a negative electrode terminal of a main battery. The buck-boost converter is configured to output the buck-boost voltage according to the feedback voltage, and the buck-boost voltage has a smaller sustaining voltage for maintaining the relay in an on state than a first reference voltage for turning on the relay.

In an embodiment, the feedback control circuit may include: a first terminal configured to receive the buck-boost voltage output from the buck-boost converter; and a second terminal configured to output the feedback voltage according to the buck-boost voltage.

In an embodiment, the feedback control circuit may further include: a first resistor electrically connected between the first terminal and the second terminal; and a second resistor electrically connected between the second terminal and ground.

In an embodiment, the feedback control circuit may further include a third resistor and a first switch connected in series with each other, the third resistor and the first switch being connected in parallel with the first resistor, and when the first switch is turned on, the buck-boost voltage may be the sustaining voltage smaller than the first reference voltage.

In an embodiment, the feedback control circuit may further include a fourth resistor and a second switch connected in series with each other, the fourth resistor and the second switch being connected in parallel with the first resistor, and when the second is turned on, the buck-boost voltage may be a diagnostic voltage smaller than a threshold voltage of the relay.

In an embodiment, the first switch may be electrically connected to a battery management system to be controlled to be turned on or off by the battery management system.

In an embodiment, the second switch may be electrically connected to a battery management system to be controlled to be turned on or off by the battery management system.

In an embodiment, the relay may be configured to be: turned on when the buck-boost voltage is at the first reference voltage; maintained in an on state when the buck-boost voltage is larger than or equal to a threshold voltage; and turned off when the buck-boost voltage is smaller than or equal to a second reference voltage.

In an embodiment, the driving control device may further include a microcontroller configured to monitor the buck-boost voltage.

In an embodiment, after the second switch is turned on, the battery management system may be configured to diagnoses monitor according to the buck-boost voltage monitored by the microcontroller.

In an embodiment, the battery management system may be configured to control on or off of the relay control circuit.

BRIEF DESCRIPTION OF DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
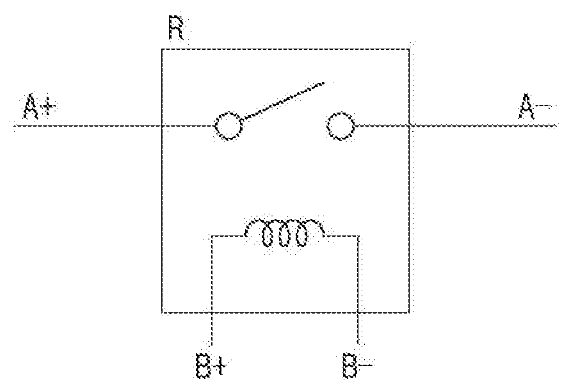
FIG. 1 is a structural diagram showing a configuration of a relay applied to a battery pack.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as “beneath,” “below,” “lower,” “under,” “above,” “upper,” and the like, may be used herein for ease of explanation to describe one element or feature’s relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as “below” or “beneath” or “under” other elements or features would then be oriented “above” the other elements or features. Thus, the example terms “below” and “under” can encompass both an orientation of above and below. The device may be otherwise oriented (e.g., rotated 90 degrees or at other orientations) and the spatially relative descriptors used herein should be interpreted accordingly.

It will be understood that, although the terms “first,” “second,” “third,” etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being “on,” “connected to,” or “coupled to” another element or layer, it can be directly on, connected to, or coupled to the other element or layer, or one or more intervening elements or layers may be present. Similarly, when a layer, an area, or an element is referred to as being “electrically connected” to another layer, area, or element, it may be directly electrically connected to the other layer, area, or element, and/or may be indirectly electrically connected with one or more intervening layers, areas, or elements therebetween. In addition, it will also be understood that when an element or layer is referred to as being “between” two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms “a” and “an” are intended to include the plural forms as well, unless the context clearly indicates otherwise. It will be further understood that the terms “comprises,” “comprising,” “includes,” “including,” “has,” “have,” and “having,” when used in this specification, specify the presence of the stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. For example, the expression “A and/or B” denotes A, B, or A and B. Expressions such as “at least one of,” when preceding a list of elements, modify the entire list of elements and do not modify the individual elements of the list. For example, the expression “at least one of a, b, or c,” “at least one of a, b, and c,” and “at least one selected from the group consisting of a, b, and c” indicates only a, only b, only c, both a and b, both a and c, both b and c, all of a, b, and c, or variations thereof.

As used herein, the term “substantially,” “about,” and similar terms are used as terms of approximation and not as terms of degree, and are intended to account for the inherent variations in measured or calculated values that would be recognized by those of ordinary skill in the art. Further, the use of “may” when describing embodiments of the present disclosure refers to “one or more embodiments of the present disclosure.” As used herein, the terms “use,” “using,” and “used” may be considered synonymous with the terms “utilize,” “utilizing,” and “utilized,” respectively.

The electronic or electric devices and/or any other relevant devices or components according to embodiments of the present disclosure described herein (e.g., the relay control circuit, the microcontroller, the battery management system, and/or the like) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a structural diagram showing a configuration of a relay applied to a battery pack.

Referring to FIG. 1, in general, a relay R may be used for opening and closing a battery pack with high current. As shown in FIG. 1, the relay R may include high-current ends A+ and A− and coil ends B+ and B−. When the coil ends B+ and B− are provided with an inductor, and a current larger than a magnetizing current flows through the inductor, both ends of the high-current ends A+ and A− are connected to each other by a generated magnetic force, and thus, current may flow through the relay R. In other words, in the relay R, both ends of the high-current ends A+ and A− may be connected to each other or disconnected from each other by the current flowing through both ends of the coil ends B+ and B−.

In the relay R, the coil ends B+ and B− may have large inductive reactance and low resistance, and the high-current ends A+ and A− may have small resistance to reduce power consumption and heat generation. The relay may have a pick-up voltage and a drop-out voltage at the coil ends B+ and B− to control driving. In other words, in order to turn on (e.g., connect) the relay, a voltage higher than the pick-up voltage may be applied to the coil ends B+ and B−, and in order to turn off (e.g., disconnect) the relay, a voltage lower than the drop-out voltage may be applied to the coil ends B+ and B−.

A feedback control circuit of the relay R may include a first resistor electrically connected between a first terminal and a second terminal, and a second resistor electrically connected between the second terminal and a ground (e.g., the Ground).

Figure 2:
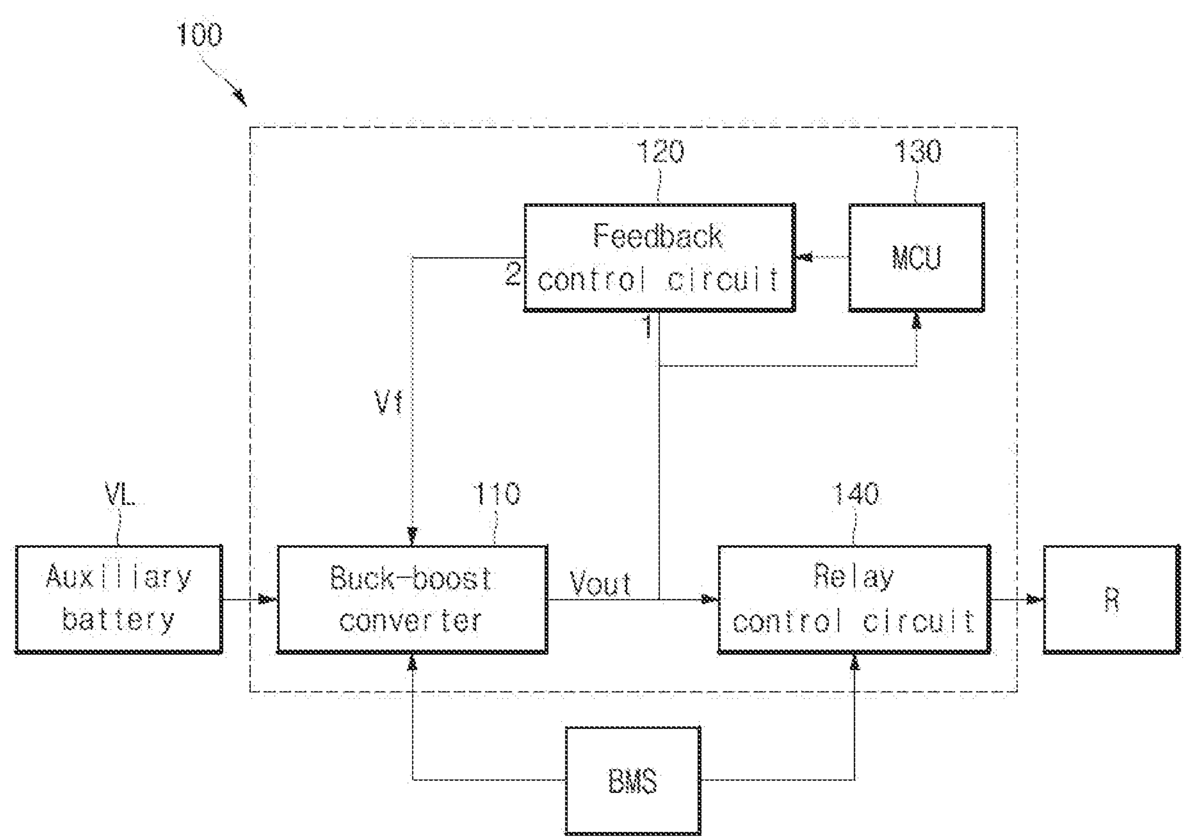
FIG. 2 is a block diagram showing a driving control device of a relay for a battery pack according to embodiments of the present disclosure.
Figure 3:
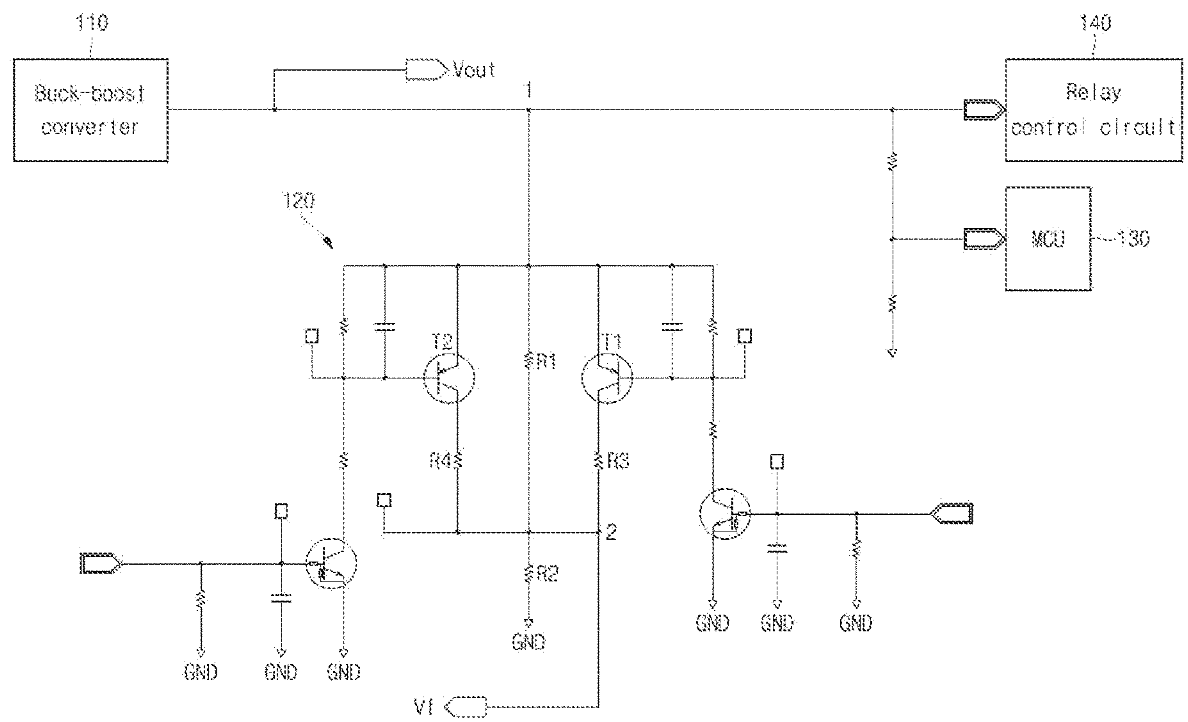
FIG. 3 is a circuit diagram of a feedback control circuit of a driving control device of a relay for a battery pack shown in FIG. 2.

FIG. 2 is a block diagram showing a driving control device of a relay for a battery pack according to embodiments of the present disclosure. FIG. 3 is a circuit diagram of a feedback control circuit of the driving control device of a relay for a battery pack shown in FIG. 2.

Hereinafter, with reference to FIGS. 2 and 3, a driving control device 100 for a relay for a battery pack according to various embodiments of the present disclosure will be described in more detail. Referring to FIGS. 2 and 3, the driving control device 100 for a relay for a battery pack may include a buck-boost converter 110, a feedback control circuit 120, and a relay control circuit 140. The buck-boost converter 110 may receive a voltage from an auxiliary battery VL, and may convert the same into a voltage for driving a relay R. The feedback control circuit 120 may transfer a feedback voltage Vf to the buck-boost converter 110 for a buck-boost voltage Vout output from the buck-boost converter. The relay control circuit 140 may apply or block the buck-boost voltage Vout to the relay R. In addition, the driving control device 100 for a relay for a battery pack may further include a microcontroller 130 for monitoring the buck-boost voltage Vout.

The auxiliary battery VL may be a battery that outputs a constant or substantially constant voltage. The auxiliary battery VL may include positive and negative electrode terminals.

The buck-boost converter 110 may be electrically connected to the auxiliary battery VL, and may receive a voltage (e.g., a certain or predetermined voltage) from the auxiliary battery VL. The buck-boost converter 110 is electrically connected to the positive and negative electrode terminals of the auxiliary battery VL, and may receive the voltage applied between the positive and negative electrode terminals from the auxiliary battery VL. The buck-boost converter 110 may output the buck-boost voltage (e.g., a set buck-boost voltage) Vout by bucking or boosting the voltage received from the auxiliary battery VL. The buck-boost converter 110 may be electrically connected to the relay control circuit 140 to apply the buck-boost voltage Vout to the relay control circuit 140.

The relay control circuit 140 may be electrically connected to the buck-boost converter 110 and the relay R. The relay control circuit 140 may serve as (e.g., may include) a switch, and may apply or block the buck-boost voltage Vout output from the buck-boost converter 110 to the relay R. The relay control circuit 140 may apply or block the buck-boost voltage Vout to the relay R according to a signal applied from a battery management system (BMS).

Figure 4:
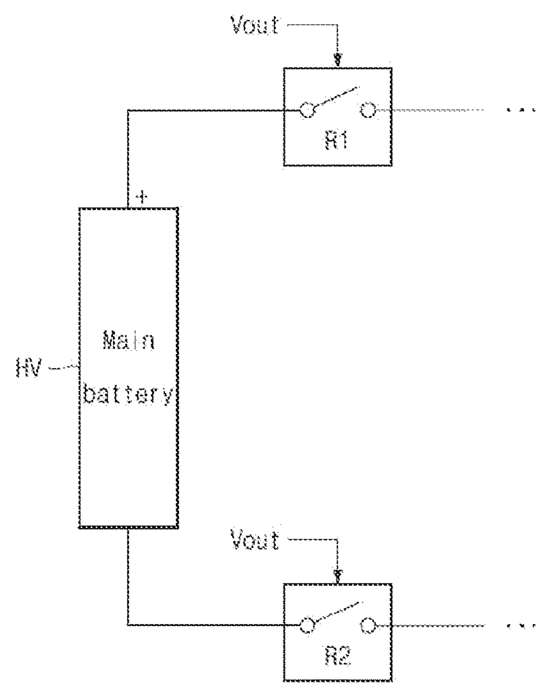
FIG. 4 illustrates an example configuration of a battery pack.

For example, as shown in FIG. 4, the relay R may include first and second relays R1 and R2 used for opening and closing a main battery HV with high current. The first and second relays R1 and R2 (e.g., each of the first and second relays R1 and R2) may be the same or substantially the same as the relay R illustrated in FIG. 1. In addition, the first and second relays R1 and R2 may be electrically connected to the positive electrode terminal (+) and the negative electrode terminal (−), respectively, of the main battery HV. Further, when the main battery HV is a vehicle battery pack, the relays R1 and R2 may further include a pre-charge relay connected in parallel with the first relay R1 that is electrically connected to the positive electrode terminal (+).

The main battery HV may have a higher voltage than that of the auxiliary battery VL, and may be a high voltage battery. The auxiliary battery VL may have a lower voltage than that of the main battery HV, and may be a low voltage battery.

The feedback control circuit 120 may be electrically connected to the buck-boost converter 110. The feedback control circuit 120 may output the feedback voltage Vf according to the buck-boost voltage Vout output from the buck-boost converter 110. The feedback voltage Vf may be transferred to the buck-boost converter 110.

The buck-boost converter 110 may output the buck-boost voltage Vout as a constant or substantially constant voltage (e.g., a set or predetermined constant voltage) through the feedback voltage Vf transferred from the feedback control circuit 120. The relay R may be turned on when the buck-boost voltage Vout is (e.g., equal to or substantially equal to) a first reference voltage, and may be turned off when the buck-boost voltage Vout is smaller than or equal to (e.g., less than or equal to) a second reference voltage. In addition, the relay R may be maintained or substantially maintained in an on state above a threshold voltage. For example, the first reference voltage may be 12V, the second reference voltage may be 2V, and the threshold voltage may be 6V. However, the present disclosure is not limited to the levels of the first reference voltage, the second reference voltage, and the threshold voltage provided herein, and they may be variously modified in various suitable manners according to the kind of relay.

For example, when the buck-boost voltage Vout output from the buck-boost converter 110 is 12V, which is the first reference voltage, the feedback voltage Vf transmitted from the feedback control circuit 120 may be 0.8V. However, the present disclosure is not limited thereto, and the level of the feedback voltage Vf may be variously modified in various suitable manners according to the configuration of the feedback control circuit 120.

The buck-boost converter 110 may check whether or not the received feedback voltage Vf is 0.8V to increase or decrease the output buck-boost voltage Vout when the feedback voltage Vf is less than or greater than 0.8V. In other words, the buck-boost converter 110 may output a constant or substantially constant buck-boost voltage Vout according to the feedback voltage Vf transferred from the feedback control circuit 120.

The feedback control circuit 120 may include a first terminal 1 electrically connected to the buck-boost converter 110 and the relay control circuit 140, and a second terminal 2 electrically connected to the buck-boost converter 110. The first terminal 1 may be a terminal that receives the buck-boost voltage Vout from the buck-boost converter 110, and the second terminal 2 may be a terminal from which the feedback voltage Vf is output according to the buck-boost voltage Vout.

In the feedback control circuit 120, a first resistor R1 for voltage distribution and a second resistor R2 may be connected in series between the first terminal 1 and a ground (e.g., the Ground) GND. In addition, the feedback control circuit 120 may further include a third resistor R3 and a fourth resistor R4, each connected in parallel with the first resistor R1. The third resistor R3 may be connected in parallel with the first resistor R1 when a first switch T1 is turned on, and the fourth resistor R4 may be connected in parallel with the first resistor R1 when a second switch T2 is turned on.

In more detail, the first resistor R1 may be electrically connected between the first terminal 1 and the second terminal 2, and the second resistor R2 may be electrically connected between the second terminal 2 and the ground GND. In other words, the feedback control circuit 120 may distribute the buck-boost voltage Vout applied through the first terminal 1 through the first resistor R1 and the second resistor R2, to be output as the feedback voltage Vf through the second terminal 2.

For example, a resistance ratio between the first resistor R1 and the second resistor R2 may be 14:1. In this case, when the buck-boost voltage Vout is 12V, the feedback control circuit 120 may output the feedback voltage Vf of 0.8V by a voltage division by the first resistor R1 and the second resistor R2.

In addition, the feedback control circuit 120 may further include the first switch T1 and the third resistor R3 connected in parallel to the first resistor R1. A first electrode of the first switch T1 may be connected to the first terminal 1 and a first electrode of the first resistor R1, and a second electrode of the first switch T1 may be connected to a first electrode of the third resistor R3. The third resistor R3 may have the first electrode connected to the second electrode of the first switch T1, and a second electrode electrically connected to the second terminal 2, the first resistor R1, and the second resistor R2.

The third resistor R3 may be connected in series with the first switch T1. The third resistor R3 and the first switch T1 that are connected in series may be connected in parallel to the first resistor R1. Therefore, in the feedback control circuit 120, when the first switch T1 is turned on, the first resistor R1 and the third resistor R3 may be connected in parallel between the first terminal 1 and the second terminal 2, and the second resistor R2 may be electrically connected between the second terminal 2 and the ground GND. According to the first switch T1, the third resistor R3 may be connected in parallel with the first resistor R1, or the third resistor R3 may be electrically separated from the first resistor R1. The first switch T1 may be turned on or off under the control of the battery management system (BMS).

For example, a resistance ratio between the first resistor R1 and the third resistor R3 may be 14:51. In this case, in order to receive the feedback voltage Vf of 0.8V, the buck-boost converter 110 may output the buck-boost voltage Vout of 8V. In other words, when the first switch T1 is turned on, the third resistor R3 is connected in parallel with the first resistor R1, and thus, in order to maintain or substantially maintain the feedback voltage Vf as a desired reference value, the buck-boost converter 110 may output 8V, which is a voltage lower than that of the first reference voltage of 12V. While the sustaining voltage of the relay R1, R2 is described as 8V, the present disclosure is not limited thereto, and the sustaining voltage may be smaller than the first reference voltage and larger than the threshold voltage. In other words, the resistance value of the third resistor R3 may be various modified in various suitable manners, so that the buck-boost voltage Vout is smaller than the first reference voltage and larger than the threshold voltage.

The battery management system (BMS) may turn on the first switch T1 when the relays R1 and R2 are turned on and should be remained on. In other words, the driving control device 100 of a relay for a battery pack may reduce the voltage for maintaining or substantially maintaining the relays R1 and R2 in a turn on state to a sustaining voltage lower than the first reference voltage. In this case, the sustaining voltage may be higher than the threshold voltage, and smaller than the first reference voltage. In other words, the sustaining voltage for maintaining or substantially maintaining the on state of the relays R1 and R2 may be smaller than the first reference voltage for turning on the relays R1 and R2. As a result, energy efficiency of the battery pack may be improved by reducing the power used in the relays R1 and R2.

In addition, the feedback control circuit 120 may further include the second switch T2 and the fourth resistor R4 connected in parallel to the first resistor R1. A first electrode of the second switch T2 may be electrically connected to the first terminal 1, the first electrode of the first resistor R1, and the first electrode of the first switch T1. A second electrode of the second switch T2 may be may be electrically connected to a first electrode of the fourth resistor R4. The first electrode of the fourth resistor R4 may be electrically connected to the second electrode of the second switch T2, and a second electrode of the fourth resistor R4 may be electrically connected to the second terminal 2, the first resistor R1, the second resistor R2, and the third resistor R3.

The fourth resistor R4 may be connected in series with the second switch T2. The fourth resistor R4 and the second switch T2 that are connected in series may be connected in parallel to the first resistor R1. In the feedback control circuit 120, when the second switch T2 is turned on, the first resistor R1 and the fourth resistor R4 may be connected in parallel between the first terminal 1 and the second terminal 2, and the second resistor R2 may be electrically connected between the second terminal 2 and the ground GND. According to the second switch T2, the fourth resistor R4 may be connected in parallel with the first resistor R1, or the fourth resistor R4 may be electrically separated from the first resistor R1. The second switch T2 may be turned on or off under the control of the battery management system (BMS).

For example, a resistance ratio between the first resistor R1 and the fourth resistor R4 may be 14:11. In this case, the feedback control circuit 120 may output the buck-boost voltage Vout of about 5.7 V, so that the feedback voltage Vf becomes 0.8 V. In other words, when the second switch T2 is turned on, because the fourth resistor R4 is connected in parallel with the first resistor R1, the buck-boost converter 110 may output a diagnostic voltage lower than the threshold voltage in order to maintain or substantially maintain the feedback voltage Vf as a desired reference value. The diagnostic voltage may be a voltage that is smaller than that of the threshold voltage, and larger than that of the second reference voltage.

While the diagnostic voltage of the relay R1, R2 is described as 5.7 V, the present disclosure is not limited thereto, and the diagnostic voltage may be smaller than the threshold voltage and larger than the second reference voltage. In other words, the resistance value of the fourth resistor R4 may be variously modified in various suitable manners so that the buck-boost voltage Vout is smaller than the threshold voltage and larger than the second reference voltage.

The microcontroller 130 may monitor the buck-boost voltage Vout, and may notify the battery management system (BMS) of an abnormality when the buck-boost voltage Vout is smaller than the threshold voltage. In addition, in the battery management system (BMS), it may be possible to verify defects by notifying whether or not there is an abnormality through an alarm.

In other words, for a diagnosis function, the battery management system (BMS) turns on the second switch T2 to make the buck-boost voltage Vout smaller than the threshold voltage, and may then check whether the monitoring function of the microcontroller 130 is operating correctly. In addition, the battery management system (BMS) may check whether or not the coil ends of the relays R1 and R2 are abnormal through the buck-boost voltage Vout monitored by the microcontroller 130.

As described above, the driving control device for a relay for a battery pack according to one or more embodiments of the present disclosure may have improved energy efficiency through power reduction, by reducing a sustaining voltage for maintaining or substantially maintaining a relay in an on state, compared to a first reference voltage for turning on the relay.

According to one or more embodiments of the present disclosure described above, in the driving control device for a relay for a battery pack, a microcontroller may be included to diagnose whether or not a monitoring operation of a buck-boost voltage is abnormal, and thus, safety may be improved.

According to one or more embodiments of the present disclosure, the driving control device 100 of a relay for a battery pack may improve energy efficiency through power reduction, by reducing a sustaining voltage for maintaining or substantially maintaining a relay in an on state by control of the feedback control circuit 120, compared to the first reference voltage for turning on the relay. In addition, in the driving control device 100 of a relay for a battery pack according to one or more embodiments, the monitoring operation of the microcontroller 130 may be diagnosed through the feedback control circuit 120, thereby improving safety.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A driving control device for a relay for a battery pack, comprising:
- a buck-boost converter configured to receive a voltage from an auxiliary battery, and output a buck-boost voltage;
- a feedback control circuit electrically connected to the buck-boost converter, and configured to transfer a feedback voltage to the buck-boost converter to control the buck-boost voltage output from the buck-boost converter; and
- a relay control circuit configured to apply or block the buck-boost voltage to a relay electrically connected to at least one of a positive electrode terminal or a negative electrode terminal of a main battery,
- wherein the buck-boost converter is configured to output the buck-boost voltage according to the feedback voltage, and
- wherein the buck-boost voltage has a smaller sustaining voltage for maintaining the relay in an on state than a first reference voltage for turning on the relay.

2. The driving control device as claimed in claim 1, wherein the feedback control circuit comprises:
- a first terminal configured to receive the buck-boost voltage output from the buck-boost converter; and
- a second terminal configured to output the feedback voltage according to the buck-boost voltage.

3. The driving control device as claimed in claim 2, wherein the feedback control circuit further comprises:
- a first resistor electrically connected between the first terminal and the second terminal; and
- a second resistor electrically connected between the second terminal and ground.

4. The driving control device as claimed in claim 3, wherein the feedback control circuit further comprises a third resistor and a first switch connected in series with each other, the third resistor and the first switch being connected in parallel with the first resistor, and
- wherein, when the first switch is turned on, the buck-boost voltage is the sustaining voltage smaller than the first reference voltage.

5. The driving control device as claimed in claim 3, wherein the feedback control circuit further comprises a fourth resistor and a second switch connected in series with each other, the fourth resistor and the second switch being connected in parallel with the first resistor, and
- wherein, when the second switch is turned on, the buck-boost voltage is a diagnostic voltage smaller than a threshold voltage of the relay.

6. The driving control device as claimed in claim 4, wherein the first switch is electrically connected to a battery management system to be controlled to be turned on or off by the battery management system.

7. The driving control device as claimed in claim 5, wherein the second switch is electrically connected to a battery management system to be controlled to be turned on or off by the battery management system.

8. The driving control device as claimed in claim 1, wherein the relay is configured to be:

turned on when the buck-boost voltage is at the first reference voltage;

maintained in an on state when the buck-boost voltage is larger than or equal to a threshold voltage; and turned off when the buck-boost voltage is smaller than or equal to a second reference voltage.

9. The driving control device as claimed in claim 7, further comprising a microcontroller configured to monitor the buck-boost voltage.

10. The driving control device as claimed in claim 9, wherein, after the second switch is turned on, the battery management system is configured to diagnoses monitor according to the buck-boost voltage monitored by the micro-controller.

11. The driving control device as claimed in claim 6, wherein the battery management system is configured to control on or off of the relay control circuit.

* * * * *